US008094582B2

(12) United States Patent
Robinson et al.

(10) Patent No.: US 8,094,582 B2
(45) Date of Patent: Jan. 10, 2012

(54) LOCATION DETERMINATION FOR PLACING A NEW CAPACITY POINT IN A WIRELESS NETWORK

(75) Inventors: Joshua P. Robinson, Houston, TX (US); Mustafa Uysal, Fremont, CA (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 12/419,633

(22) Filed: Apr. 7, 2009

(65) Prior Publication Data
US 2010/0254260 A1    Oct. 7, 2010

(51) Int. Cl.
*H04L 12/28* (2006.01)
(52) U.S. Cl. ........ 370/254; 370/328; 370/401; 455/453; 709/226
(58) Field of Classification Search .......... 370/254–258, 370/328, 329, 338, 400, 401; 455/450–453; 709/223–226
See application file for complete search history.

(56) References Cited

U.S. PATENT DOCUMENTS

2004/0054767 A1 * 3/2004 Karaoguz et al. ............. 709/223
2007/0291663 A1 * 12/2007 Dixit et al. ..................... 370/254
2008/0151833 A1 * 6/2008 Natarajan ...................... 370/331

OTHER PUBLICATIONS

Chuzhoy et al., Approximating k-Median with Non-Uniform Capacities, Year: 2005.*

Chaska.net and Tropos unwire Chaska, Minnesota, Tropos Networks White Paper, Jan. 2007.
Arya, V. et al., "Local Search Heuristics for k-median and Facility Location Problems", STOC'01, Jul. 2001, ACM.
Camp, J. et al., "Measurement driven deployment of a two-tier urban mesh access network", in Proceedings of ACM MobiSys, Sweden, Jun. 2006.
Chandra, R. et al., "Optimizing the placement of integration points in multi-hop wireless networks", In Proceedings of ICNP, Berlin, Germany, Oct. 2004.
Cherry, S., "Wi-Fi nodes to talk amongst themselves", IEEE Spectrum, Jul. 2006.
Chuzhoy, J. et al., "Approximating k-median with non-uniform capacities", In Proceedings of SODA '05, 2005.
Jain, K. et al., "Impact of interference on multi-hop wireless network performance" In Proceedings of ACM MobiCom, Sep. 2003.
Kodialam, M. et al., "Characterizing the capacity region in multi-radio multi-channel wireless mesh networks", In Proceedings of ACM MobiCom, Cologne, Germany, Aug. 2005.
Levi, R. et al., "LP-based approximation algorithms for capacitated facility location", In Proceedings of IPCO, New York, NY, Jun. 2004.
Liu, B. et al., "On the capacity of hybrid wireless networks", In Proceedings of IEEE INFOCOM'03, San Fransisco, CA, Apr. 2003.
Mahdian, M. et al., "Universal facility location", In Proceedings of the 11th Annual European Symposium on Algorithms (ESA), 2003.
Mahdian, M. et al., "Improved approximation algorithms for metric facility location problems", Workshop on Approximation Algorithms for Combinatorial Optimization, 2002.

(Continued)

*Primary Examiner* — Pao Sinkantarakorn (57) ABSTRACT

A location for placing a new capacity point in a wireless network is determined based on a wireless contention of the network and capacities for capacity points in the network. Each capacity point is a network device interfacing the network with a second network. The capacities are calculated as a function of the wireless contention.

18 Claims, 6 Drawing Sheets

OTHER PUBLICATIONS

Pal, M. et al., "Facility location with nonuniform hard capacities", In IEEE Symposium on Foundations of Computer Science, pp. 329-338, 2001.

Prasad, R. et al., "Minimum-cost gateway deployment in cellular wi-fi networks", In Consumer Communications and Networking Conference, Las Vegas, NV, Jan. 2006.

Qiu, L. et al., "On the placement of web server replicas", In Proceedings of IEEE INFOCOM 2001, Anchorage, Alaska, Apr. 2001.

Robinson, J. et al., "A performance study of deployment factors in wireless mesh networks", In Proceedings of IEEE INFOCOM 2007, Anchorage, AK, May 2007.

Zhang, J. et al., "Multi-exchange local search algorithm for the capacitated facility location problem", In Proceedings of IPCO, Berlin, 2004.

El-Fiky M. et al., "Study on Quantum Heuristic Search in an NP-Hard Problem", downloaded Apr. 2, 2009.

* cited by examiner

LOCATION DETERMINATION FOR PLACING A NEW CAPACITY POINT IN A WIRELESS NETWORK

RELATED APPLICATIONS

The present application is related to U.S. patent application Ser. No. 12/433,807, filed Apr. 30, 2009, entitled "Selecting Wireless Mesh Node Locations", by Joshua P. Robinson, Mustafa Uysal, and Ram Swaminathan; and U.S. patent application Ser. No. 12/433,717, filed Apr. 30, 2009, entitled "Determining a Metric Region in a Wireless Network", by Joshua P. Robinson and Ram Swaminathan, all of which are incorporated herein by reference in their entirety.

BACKGROUND

Wireless mesh networks are ubiquitous as a cost-effective means to provide broadband connectivity to large user populations. For instance, wireless mesh networks are being deployed in many cities in order to provide ubiquitous Internet access. A mesh network's gateway nodes that connect the wireless mesh with the wired Internet are critical capacity points as their location and quantity determine the maximum throughput supported by the mesh network. Namely, the placement of these gateways determines the hop-length of the paths in the network, the amount of congestion, and the available bandwidth to and from the Internet. As the network usage grows, new gateways need to be added to provide additional available bandwidth capacity (i.e., maximize throughput) to and from the Internet.

Determining the locations to add gateway nodes to maximize capacity is difficult. One of the challenges is that the contention on each gateway depends on the full routing matrix. In addition, a greater amount of contention leads to less available capacity. Thus, each gateway's capacity depends on the locations of other gateways and cannot be known in advance of placing a gateway in a new location. Hence, the available capacity at any given gateway is heavily dependent on where all other gateways are located. For this reason, one gateway cannot be just placed at a time. The process can be time consuming, especially for large mesh networks where contention can be a factor in many locations.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Mesh networking is a way to route data between nodes. A node is an electronic device with a network interface that is capable of sending or receiving data via the network. Mesh networking allows for continuous connections and reconfiguration around broken or blocked paths by "hopping" from one node to another node until the destination is reached. When nodes are all connected to each other in a mesh network, it is a fully connected network. Mesh networks differ from other networks because the component nodes can all connect to each other via multiple hops, and they generally are not mobile. Other nodes in the mesh network may be mobile, such as mobile user devices including cell phones, laptops, etc. Mesh networks are self-healing in that the network can still operate even when a node breaks down or a connection goes bad. As a result, mesh networks are very reliable. A mesh network may include wired and wireless nodes. Thus, a mesh network may include both wireless network and wired network.

Figure 1:
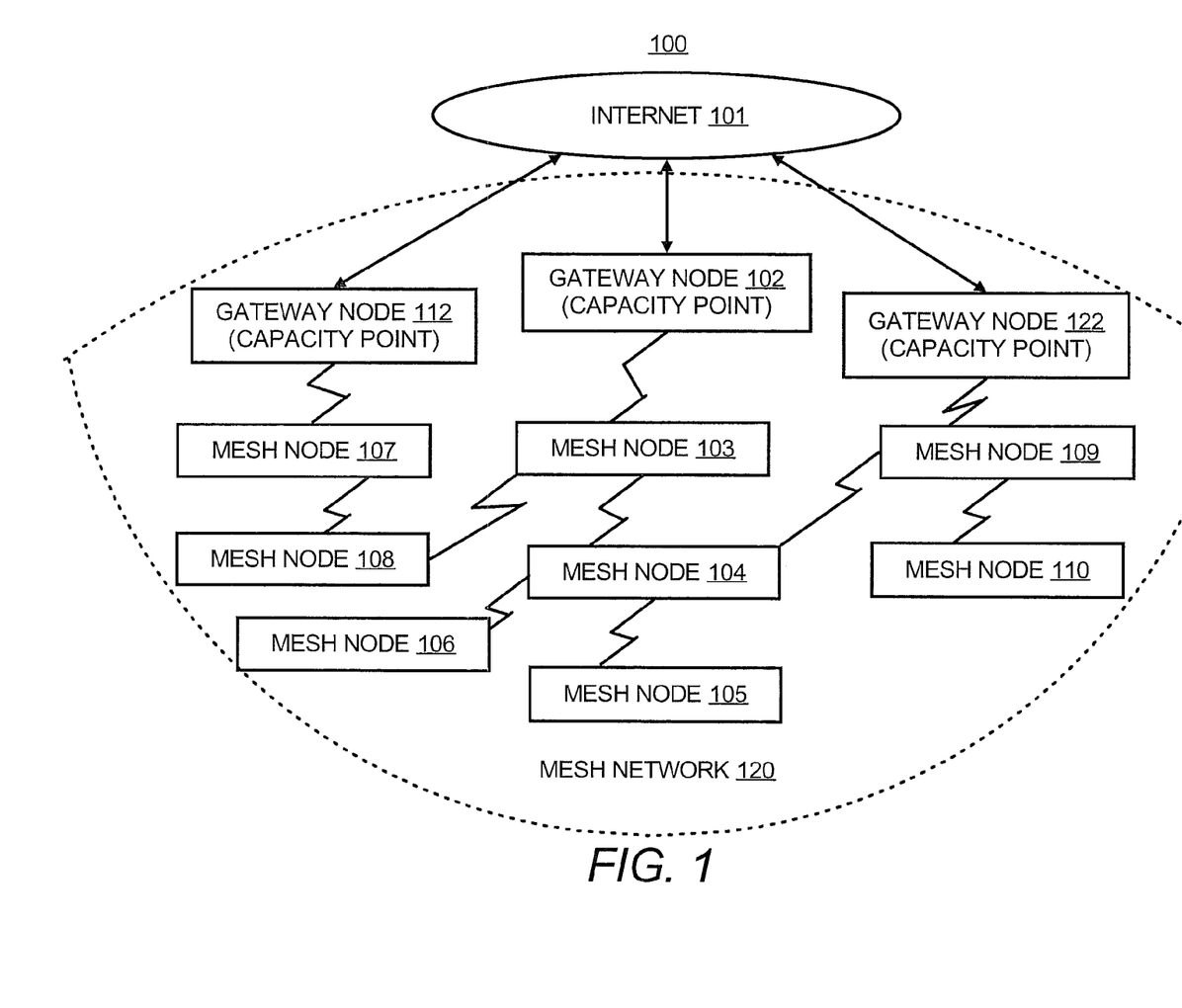
FIG. 1 shows a simplified block diagram of a system including a wireless mesh network, according to an embodiment of the present invention.

FIG. 1 illustrates a block diagram of a system 100 including a wireless mesh network 120, according to an embodiment of the present invention. The system 100 includes Internet 101 and the mesh network 120. The mesh network 120 may be connected to an access network or any wide area network (WAN) or other network, and not just the Internet.

The mesh network 120 includes multiple nodes, shown as mesh nodes 103-110 and gateway nodes 102, 112, and 122. The gateway nodes 102, 112, and 122 are also referred to as capacity points because they provide the throughput or available bandwidth to the Internet. The gateway nodes 102, 112, and 122 are network nodes equipped for interfacing with another network outside the mesh network 120 that may use different protocols. Gateway nodes are also referred to as gateways. In FIG. 1, the mesh nodes 103-110 are wirelessly connected to one or more other mesh node and to at least one gateway node directly or via multiple hops.

An embodiment of the present invention provides a method for calculating a capacity or a gateway-limited fair capacity as a function of the contention at each gateway node. The capacity is defined as the amount of available bandwidth between mesh nodes and the external network. The gateway-limited fair capacity is the capacity of a gateway node that is dependent on cost and contention. The gateway-limited fair capacity and contention are described in further detail below. Gateway placement processes are described that use local search operations to maximize the capacity gain on an existing network. Capacity gain is the amount of available bandwidth to the Internet that is gained by adding a new gateway node. The gateway placement processes include MinHopCount and MinContention. MinHopCount is adapted from provably approximate solutions to the facility location problem. MinHopCount minimizes path lengths and iteratively estimates the wireless capacities of a new gateway node placed at different gateway locations. MinContention is adapted from the uncapacitated k-median problem and minimizes average contention on mesh nodes, i.e., the number of contending links and how heavily used they are.

A mesh network's directional links and gateway nodes that connect the wireless mesh with the wired Internet are critical capacity points because their location and quantity determines the maximum throughput supported by the network. The placement of these points determines the hop-length of the paths in the network, the amount of congestion, and the available bandwidth to and from the Internet.

In one embodiment, a method to incorporate the effects of wireless contention to calculate the gateway-limited fair capacity of a wireless mesh network is disclosed. Here, access networks without direct client-to-client communication, i.e., networks in which all traffic traverses the gateway, are focused. Thus, capacity points necessarily carry more traffic than other mesh nodes, and consequently gateway-limited fair capacity in terms of the contention experienced at each gateway is defined. Calculations employed in the embodiments can be used for local search operations and for optimization of path lengths and contention.

In one embodiment, a method of calculating the capacity for a gateway models the wireless interface of a gateway as alternating its time between transmitting to one-hop neighbors, receiving from one-hop neighbors, and deferring to other neighbors within contention range. The time a gateway spends deferring to ongoing transmissions in contention range reduces the gateway's available capacity. Therefore, the gateway-limited fair capacity is defined as a function of the airtime utilization of the gateways, which depends on the routes used and amount of time the routes lead to a gateway deferring. In this definition, the gateway's capacity is significantly affected by fairness. For example, allocating all resources to one-hop flows and none to multi-hop flows will yield the greatest capacity but would be undesirable as large portions of the network would be non-functional. Consequently, a per mesh node fairness constraint, requiring that each mesh node receives its fair share of the wireless airtime at the gateway nodes is imposed.

For the purpose of description, let n be the total number of mesh nodes in the network, and m the total number of links. Define g as the set of all potential gateway locations, which is a subset of M, the set of all mesh nodes. Mesh node i has a traffic demand d[i] that represents the aggregate demand of all the end-clients associated with it. The routes used by each mesh node to reach one or more gateways is represented as a two-dimensional matrix R, where R[i, j] indicates the amount of node i's demand that traverses link j. src(i) is designated as the access tier link for mesh node i and R[i, src(i)]=d[i] is assigned. The calculations ensure fairness by requiring that $\lambda$d[i] units of mesh node i's demand are served by gateways. The positive valued $\lambda$ parameter is uniform for all mesh nodes and therefore leads to weighted fair shares being enforced. The demands are scaled with the $\lambda$ parameter such that they are feasible, and then the R matrix is determined as solution to a transshipment problem optimizing capacity, potentially allowing multipath routing. The contention caused by each link in a two-dimensional matrix I, where l[i; j] indicates if link j is in contention range of node i, are represented. The I matrix includes values from 0 to 1 as opposed to just 0 or 1 and this is how it extends to links that contend only a fraction of the time. The I matrix notation extends to links that, due to physical layer shadowing, only cause contention during a fraction of time.

The method of calculating the amount of time a gateway is idle due to contention proceeds as follows. A link induces contention equal to the number of mesh nodes that cannot be active transmitting or receiving when the link in question is active. Consequently, the total contention on a gateway depends on how many routes use the link and how much demand is routed over the link. Contention is used as a simplification of interference, as situations in which a node is forced to defer due to either concurrent transmission or interference are concerned, in particular.

The total contention on a gateway node g∈g caused by link j is $$\sum_{i=1}^{n} R[i, j] \times I[g, j].$$

The total contention on gateway g, vg is then given by Equation (1):

$$v_g = \sum_{j=1}^{m} \sum_{i=1}^{n} R[i, j] \times I[g, j] \quad (1)$$

The capacity of a gateway is computed as Equation (2). Gateway g services total demand sg, which is the sum of demands on all links incident to gateway g:

$$s_g = \sum_{i=1}^{n} \sum_{j \in link(g)} R[i, j] \quad (2)$$

where link(g) is the set of all links incident on node g. Expressing the capacity of gateway g as the amount of wireless time vg required to serve sg units of time at the wired interface, ug=sg/vg. Thus, the total gateway-limited fair capacity is the sum of uj terms for all j∈g.

This calculation is a lower bound of the actual gateway-limited capacity due to potential double-counting of links in contention with the gateway. This may occur if two links that contend with a specific gateway are not in contention with each other and can therefore be active simultaneously. In this case, the gateway is deferring to two links at once, whereas the calculation based on Equation (2) would count separately the defer time for both links.

Here, the problem of deciding how best to place a fixed number of additional capacity points in an existing mesh network so as to maximize the overall capacity gain or throughput is referred to as the gateway placement problem and it is defined as follows. Let G be a (0, 1) vector of size n that indicates whether a given mesh node i is a capacity point or not. On an operational mesh network, G[i]=1, for all i∈g. Let the monetary cost of installing a capacity point i be f[i]. The total cost of installing capacity points in the mesh network is defined as Equation (3):

$$C(G) = \sum_{\forall i \notin g_0} f[i] \times G[i] \quad (3)$$

The set g0 represents the currently deployed capacity points, and the cost C(G) depends only on the newly deployed capacity points.

The placement problem is difficult because it requires simultaneously solving three sub-problems: 1) gateway selection, 2) client assignment to gateways, and 3) route selection. The approximation schemes described in the next paragraphs use local search methods to decouple these sub-problems. The processes solve the problems of client assignment to gateways and route selection together in order to evaluate the effectiveness of all possible local operations.

Embodiments of maximizing capacity with local search processes optimize at least one of the two major components of the capacity calculation: the size of the routes in R and the impact of contention in I on mesh nodes. The first process, performs this by minimizing hop count as a capacitated facility location problem with a budget constraint, and solving the problem with local operations open( ) and close( ) and iterative capacity estimation. The second method minimizes average contention as an uncapacitated k-median problem, solved by local swap( ) operations.

First, the facility location problem is described. Let $\mathcal{M}$ be a set of customers, and $\mathcal{W}$ be a set of facilities. Each customer $i \in \mathcal{M}$ has a demand d[i]. Each facility $j \in \mathcal{W}$, has a maximum capacity u[j] and a facility cost f[j]. The cost matrix C[i, j] represents the cost of serving one unit of demand from customer i by the facility j. A facility can satisfy a customer demand only if it is open.

The facility location problem then is finding a set of open facilities, $g$, with minimum total cost as Equation (4):

$$\sum_{j \in g} f[j] + \sum_{j \in g, i \in M} C[i, j] \times X[i, j] \quad (4)$$

where X[i, j] denote the fraction of demand from customer i served by facility j. In the present formulation of the gateway placement problem, the facilities map to capacity points and the customers correspond to mesh nodes. The first major difference is that the wireless capacity of each gateway depends on nearby contention, which in turns depends on the placement of other gateways. Therefore, the capacities are not known a priori because it would require knowledge of the final placement. The second major difference is that defining a cost function for serving mesh node i by gateway j does not preserve the triangle inequality. This cost is equal to the fair share of mesh node i at gateway j. If the customer and facility cost metrics do not preserve the triangle inequality, no constant factor approximation processes are known. Despite these differences, the local search processes of the embodiments are applicable to the gateway placement problem to identify a new location for placing a gateway node.

Now, the local search algorithm for the facility location problem in the context of the gateway placement problem, highlighting modifications to account for gateway placement specifics is described. "s" is denoted as a node and "$\mathcal{T}$" is denoted as a set of nodes. The process can do one operation at a time in a repeated fashion as long as there is one operation possible that increases capacity to improve the solution: add(s) installs a gateway at node s, open(s; $\mathcal{T}$) installs a gateway at node s and removes gateways at all nodes in set $\mathcal{T}$, and close(s; $\mathcal{T}$) removes the gateway at node s and installs gateways at all nodes in set $\mathcal{T}$.

Here, the set of available gateway locations is referred to as $\mathcal{W}$, which is a site-specific subset of all mesh node locations. Let g represent the set of installed gateway locations throughout the execution of the algorithm, i.e., G[i]=1, if $i \in g$. The local search algorithm operates as follows. It is started with an arbitrary valid gateway placement and perform one of the three operations, add( ), open( ), and close( ), to improve the quality of the solution. To ensure the algorithm terminates in polynomial time, it is required that each step lowers the cost by at least c(S)/p(n, $\epsilon$), where p(n, $\epsilon$) is a chosen polynomial in n and $1/\epsilon$. Here, $\epsilon$>0 indicates the error tolerance, and the algorithm's run time is polynomial in $1/\epsilon$.

Each local search operation will be described in more detail next. Because all possible combinations for set $\mathcal{T}$ cannot be evaluated in polynomial time, the algorithm instead finds a good choice for the set $\mathcal{T}$ as the solution to a knapsack problem. The operations proceed as follows.

"add(s)"—For all non-gateway nodes s, evaluate the cost to open a gateway at $s \in \mathcal{W}$. This cost evaluation requires solving a transshipment problem to find optimal routing matrix R for the set of all installed gateways in g U {s}.

"open(s; $\mathcal{T}$)"—Install gateway at node $s \in \mathcal{W}$ and remove gateways in set $\mathcal{T} \subset g-\{s\}$, reassigning mesh nodes served by $\mathcal{T}$ to the gateway at s. Note that gateway s could already have been installed with some unused capacity.

"close(s; $\mathcal{T}$)"—Remove gateway $s \in g$ and install a set of gateways $\mathcal{T} \subset \mathcal{W}-\{s\}$. Then, reassign routes destined to s to gateways in $\mathcal{T}$ without any effect on mesh nodes served by other gateways.

Next, modifications to allow the process to minimize hop count subject to a budget constraint (e.g., monetary constraint) and then method for iteratively estimating gateway capacity are described. Hop count is used as the cost function in this problem, which is a first-order approximation of the capacity, i.e. reduces the negative impact of non-zero R entries in Equation (1) above. Another important advantage of this metric is that it preserves the triangle inequality, permitting constant factor local search processes. A budget constraint to the MinHopCount process makes the problem harder because it transforms it into a generalization of the capacitated k-median problem. It is more general because it allows all gateway costs, f[i], to be different. While there are no known constant factor approximation processes for the capacitated k-median problem, the process performs close to optimal in realistic topologies.

The local search operations find a placement subject to gateway capacity constraints, but these gateway capacities are not known a priori because they depend on the full gateway placement. As shown above in MinHopCount process, the estimation of the wireless gateway capacities, u[i], is iteratively improved after successive runs of the local search process. The process terminates when the capacity estimates u[i] converge to within a user-chosen tolerance of the best estimate.

The estimates for the u[i] capacity values can be adjusted by comparing the previous estimate u[i] with the calculated capacities of the resulting placement, û[i]. The new estimate is found as u[i]−α(u[i]−û[i]). The variable α is a parameter on [0, 1] for this process that determines how conservatively to update the estimates. Values of α close to 1 result in fewer iterations with greater error and possibility of oscillation.

The second local search process, MinContention, finds the gateway placement that minimizes the average contention in the network. First, the k-median problem and a local search process using local swap( ) operations are described. Second, how to map the gateway placement problem to this process such that the placement with the lowest average contention can be found is described next.

The k-median problem is a variant of the facility location problem where there are only a fixed number k of facilities that can be opened. The k-median problem can minimize the cost of connecting all clients to a facility. Uncapacitated version of the problem, i.e. no capacity constraint on facilities, is considered as there is currently no known constant factor process for the capacitated k-median problem. In contrast, there is a local search process for the uncapacitated version of the k-median problem with a locality gap of 3+2/p, where the locality gap is defined as the difference between the worst local optimum placement and the global optimum placement. This local search process is based on swapping p open gateways for equal number of gateways.

The MinContention process is to install k gateways to minimize the average contention on the mesh nodes, which is a function of which links contend with each node and how often those links are used in routes. It is also to minimize the total contention on gateways, per the definition described above, but it is difficult to do that because it requires knowing the full gateway placement to correctly assign link weights. Therefore, the problem of minimizing the full contention can be solved as a means of approximating the true problem. Note that it requires identical gateway costs.

The MinContention process repeatedly swaps sets of gateways in the current solution with new gateways until no possible swaps can be found that improve the placement. The quality of the placement is the sum of the active link weights, which are each assigned to be the total number of mesh nodes in contention range of the link. Additionally, the shortest paths' weight is scaled in proportion to the node's traffic demand. This allows considering client demands and favoring installing gateways nearer to mesh nodes with greater demand. The parameter "p" controls the number of gateways to consider for simultaneous swapping and a larger p value leads to more accurate results but with exponential increase in running time.

In order for the above process to have a provable locality gap of 3+2/p, the link weights must obey the triangle inequality. As stated above, the assigned link weight is the size of the union of the sets of nodes in contention range with each endpoint of the link, and it preserves the triangle inequality as described below.

Consider a triangle of three mesh node locations, a, b, and c, and the resulting three links between them, labeled AB, AC, and BC. The contention caused by link AB is less than the sum of the contention of links AC and BC for the following reason. Let function i( ) represent the number of nodes in contention with a node or link. By definition, link AB's contention consists of the nodes in contention range of nodes a and b, resulting in $i(AB)=i(a) \cup i(b)$. The contention caused by links AC and BC is $(i(a) \cup i(c))+(i(b) \cup i(c))$ and is smallest when node c contends with no mesh nodes. Therefore, the contention is lower-bounded by $i(a)+i(b)$, which is greater than or equal to $i(AB)$, ensuring that the triangle inequality is preserved.

Figure 2:
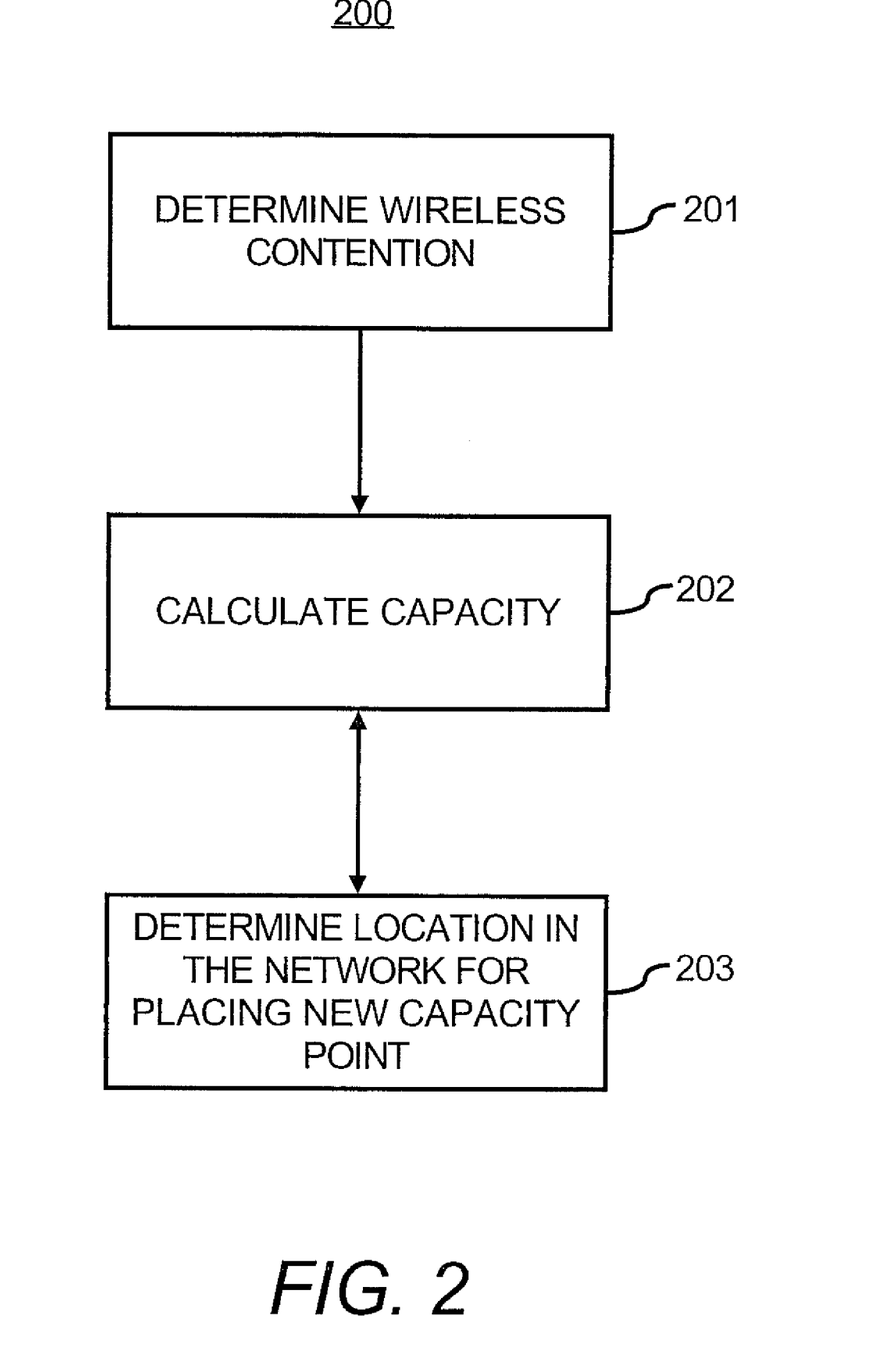
FIG. 2 illustrates a flowchart for a method to determine a location for a new capacity point in a wireless network, according to an embodiment of the present invention.

An embodiment of a method in which the system 100 shown in FIG. 1 may be employed for determining a location for a new capacity point in a wireless network is described with respect to the following flow diagram of the method 200 depicted in FIG. 2. It should be apparent to those of ordinary skill in the art that the method 200 and the other methods described herein represent a generalized illustration and that other steps may be added or existing steps may be removed, modified or rearranged without departing from the scopes of the methods. Also, the methods are described with respect to the mesh network of FIG. 1 by way of example and not limitation, and the methods may be used in other systems or other types of networks, wired or wireless.

FIG. 2 illustrates a flowchart for a method to determine a location for a new capacity point in a wireless network to maximize a capacity gain of the network, according to an embodiment of the present invention.

At step 201, a wireless contention of the network for each of a plurality of capacity points in the network is determined. Equation (1) may be used to calculate the wireless contention at step 201. At step 202, a capacity for each of the plurality of capacity points in the network as a function of the wireless contention at the capacity point is calculated. A calculation of a capacity for step 202 is described in detail with respect to FIG. 3. Here, the capacity may be a gateway-limited fair capacity. Finally, at step 203, a location in the network for placing the new capacity point based on the capacities that are determined at step 202 is determined. It should be pointed out that step 202 may be used iteratively to determine a location in the network for placing the new capacity point. Here, the location is a geographical location in the mesh network. The mesh network includes a wireless network and the location is a geographic location in the wireless network. Buildings, landscape and other factors may cause one location to be better than another. Two different processes according to the embodiments of the present invention for determining a location in the network for placing the new capacity point are described with respect to FIGS. 4 and 5.

Figure 3:
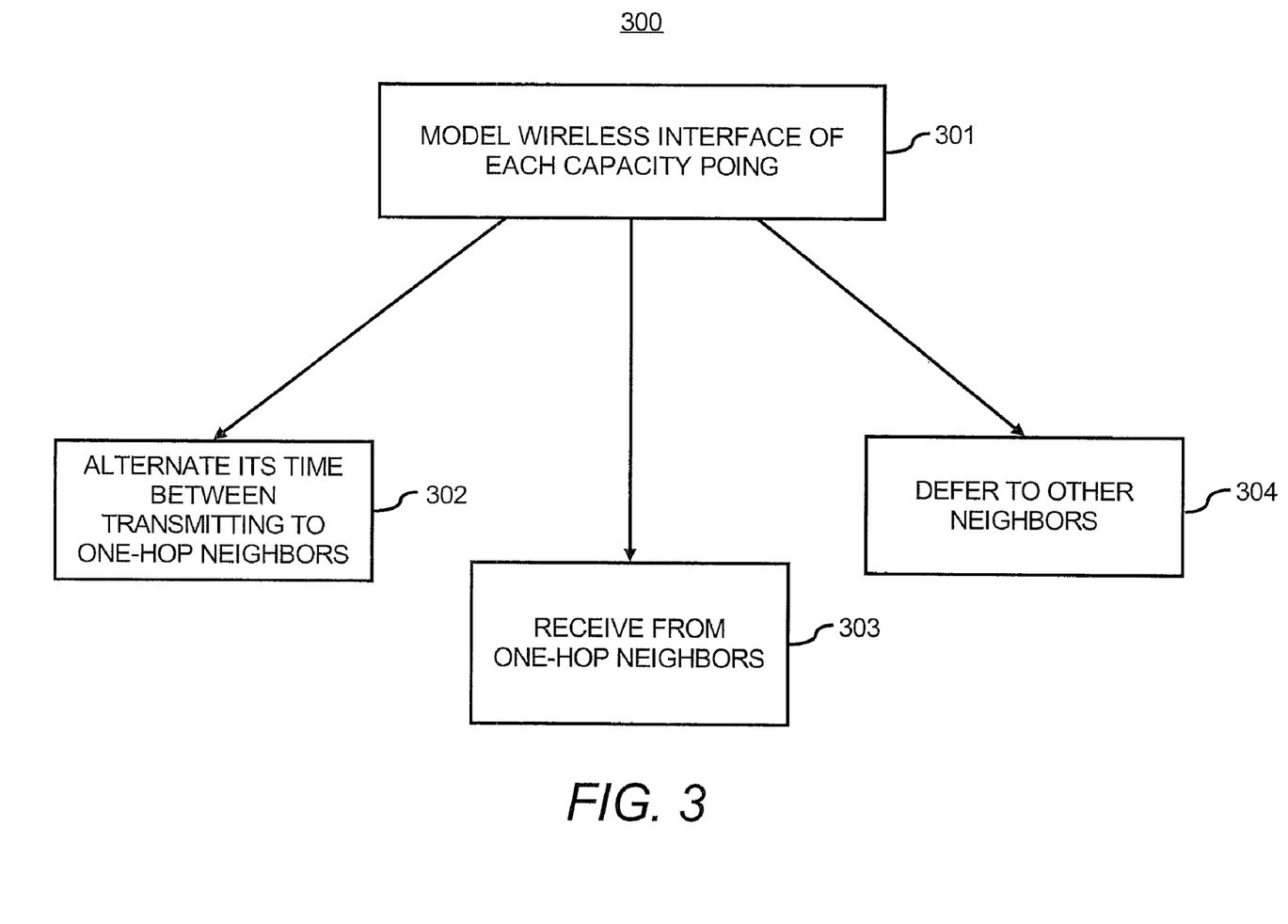
FIG. 3 illustrates a flowchart of a method for calculating a capacity for each of the plurality of capacity points in the network, according to an embodiment of the present invention.

FIG. 3 illustrates a flowchart of a method for calculating a capacity for each of the plurality of capacity points in the network, according to an embodiment of the present invention.

At step 301, a wireless interface of each capacity point is modeled. At step 302, the interface is modeled by assuming the time between transmitting the wireless interface to one-hop neighbors is alternated; at step 303, the wireless interface is received from one-hop neighbors; and at step 304, the wireless interface is deferred to other neighbors within a contention range. The capacity is calculated using the model and Equation (2).

Figure 4:
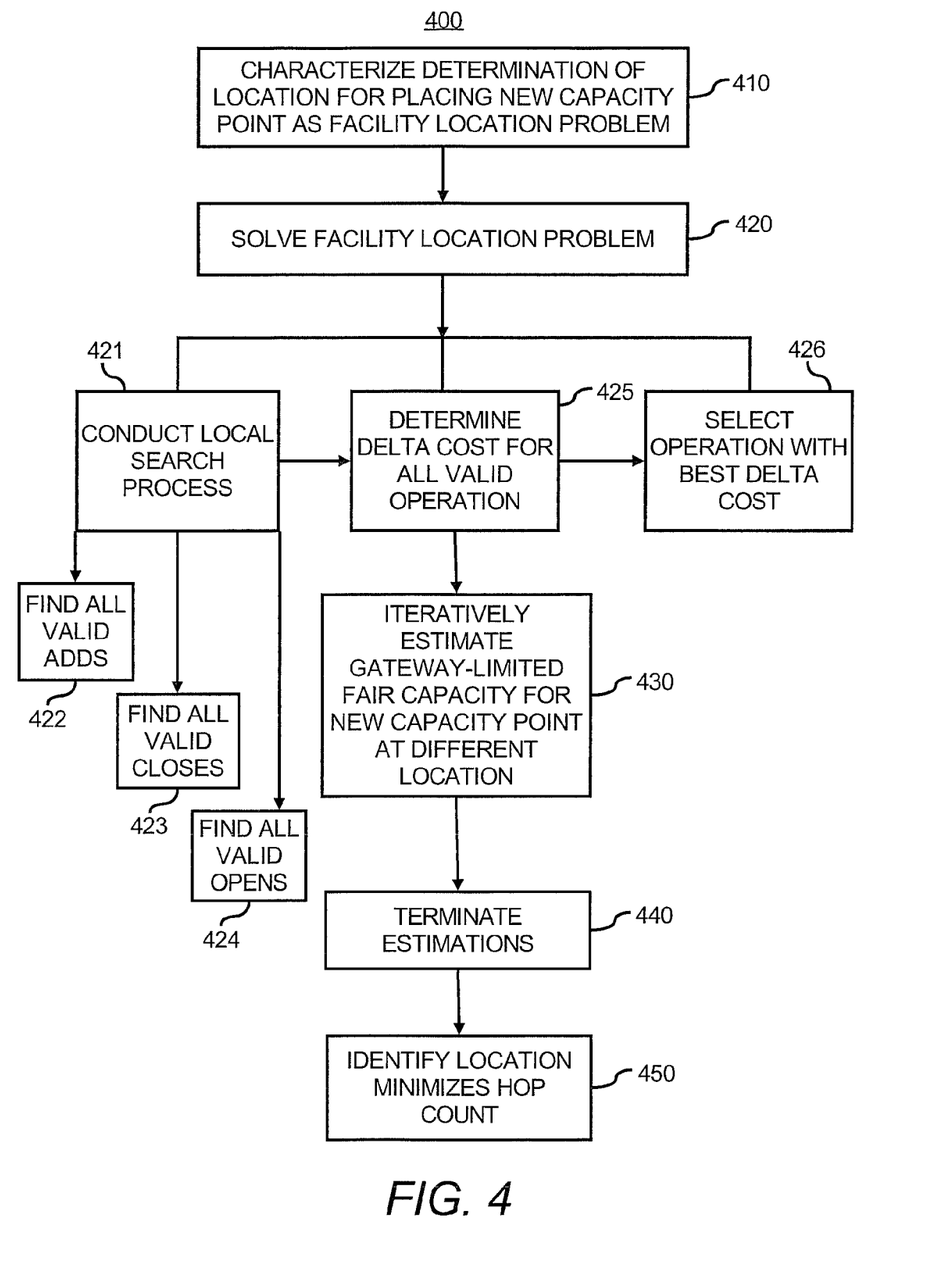
FIG. 4 illustrates a flowchart of a method for determining a location for placing the new capacity point in the network based on the MinHopCount algorithm, according to an embodiment of the present invention.

FIG. 4 illustrates a flowchart of a method for determining a location for placing the new capacity point in the network based on the MinHopCount process, according to an embodiment of the present invention.

At step 410, determining a location for placing the new capacity point is characterized as a facility location problem. The capacity points map to facilities in the facility location problem at step 410. Also, nodes in the network map to customers in the facility location problem at step 410. At step 420, the facility location problem characterized at step 410 is solved to determine the location for placing the new capacity point. Here, a minimum total cost is calculated from a facility cost. The calculated minimum total cost and a cost of serving one unit of demand from a customer by a facility are used to solve the facility location problem at step 420.

Steps 421, 425, and 426 are substeps for step 420 to solve the facility location problem. Also, steps shown below each of steps 421 and 422 are substeps for steps 421 and 422 respectively. At step 421, a local search process is conducted. At step 425, a delta cost for all the valid operations is determined. At step 426, the operation with a best delta cost to determine an optimum location for placing the new capacity point is selected. Step 421 further includes three different steps, steps 422, 423, and 424 to conduct the local search process. Step 422, finds all valid adds for the network, and each add determines a cost to make a node in the network a capacity point. Step 423 finds all valid opens, and each open makes a node in the network a capacity point and removes and reassigns capacity points. Step 424, finds all valid closes, and each close removes a capacity point and installs a set of capacity points. The open, close, and add operations are described in detail above.

At step 430, a gateway-limited fair capacity for the new capacity point at different locations is iteratively estimated. At step 440, the estimations is terminated when the gateway-limited fair capacity exceeds a predetermined threshold that a user sets. Finally, at step 450, a location that minimizes a hop count between the new capacity point and one or more nodes in the network is identified. At step 450, the location identification may be subject to a budget constraint. If the budget constraint is not satisfied than a another location may be selected, such as the next best location that minimizes hop count.

Figure 5:
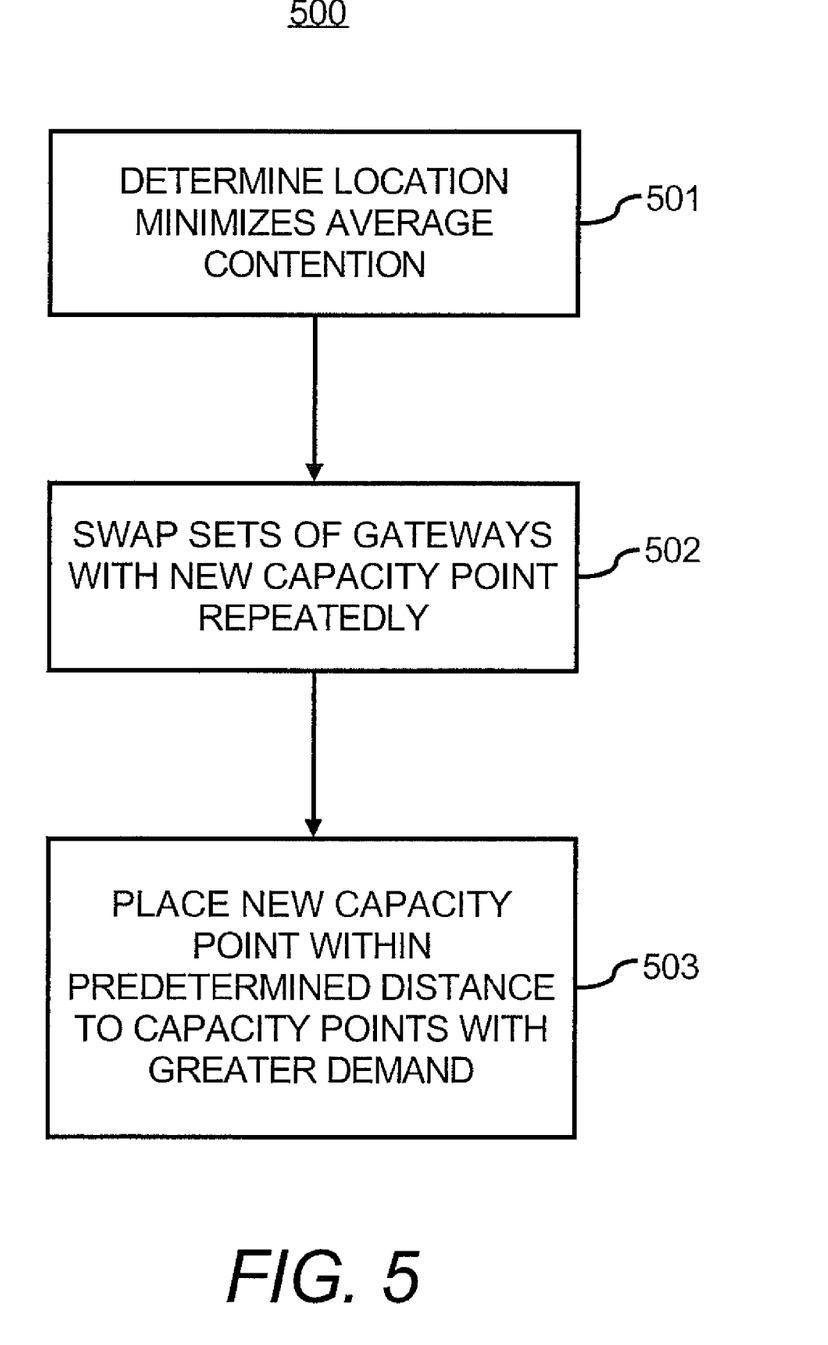
FIG. 5 illustrates a flowchart of a method for determining a location for placing the new capacity point in the network based on the MinContention algorithm, according to an embodiment of the present invention.

FIG. 5 illustrates a flowchart of a method for determining a location for placing the new capacity point in the network based on the MinContention process, according to an embodiment of the present invention.

At step 501, a location that minimizes an average contention in the network for placing the new capacity point based on a k-median problem is determined. Here, k represent a fixed number of facilities that can be opened. At step 502, sets of gateways with the new capacity point are repeatedly swapped until no possible swaps can be found that improve the minimizing the average contention. Finally, at step 503, the new capacity point is placed within a predetermined distance to capacity points with greater demand.

Figure 6:
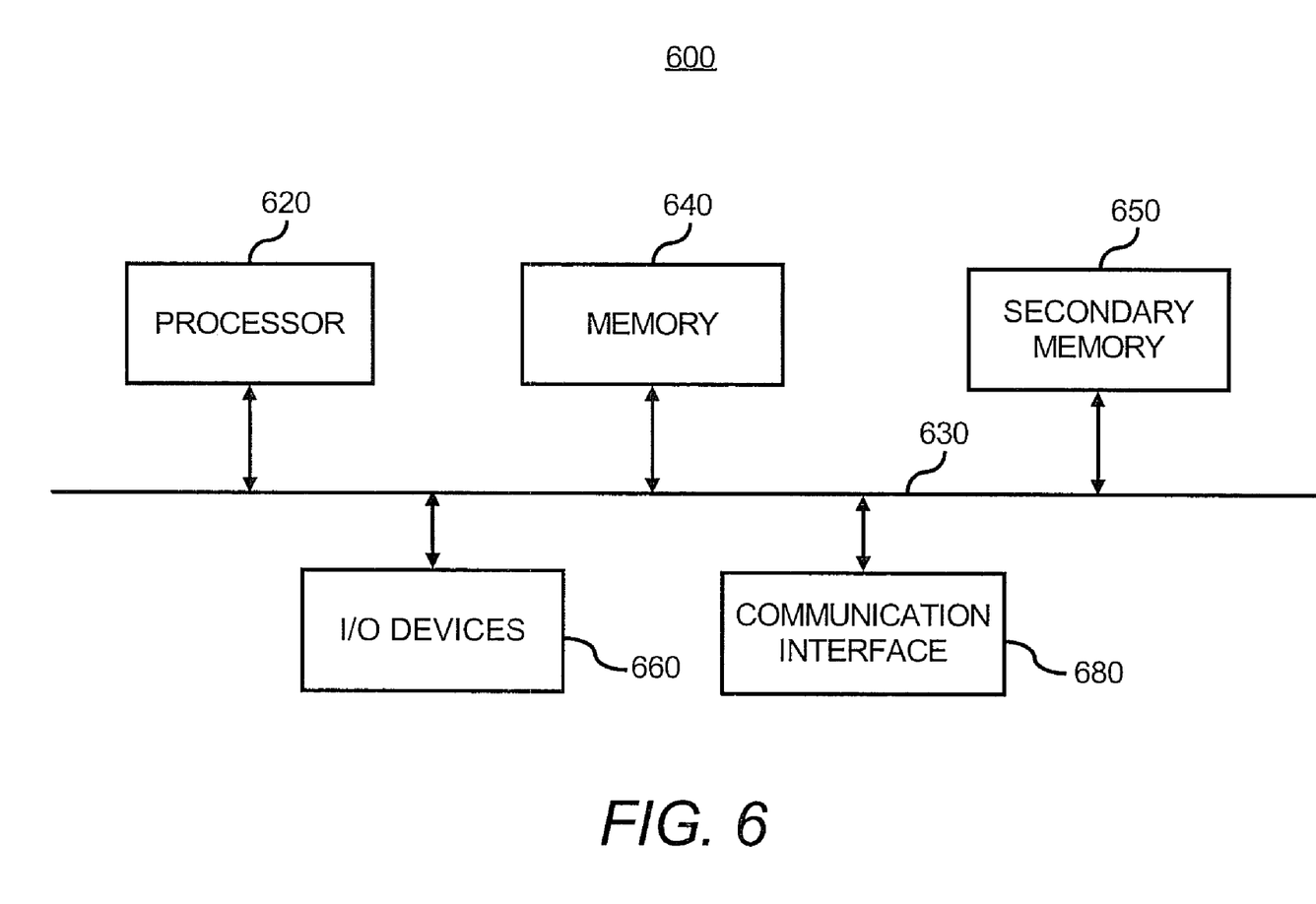
FIG. 6 shows a block diagram of a computer system that may be used as a platform for devices shown in FIG. 1, according to an embodiment of the present invention.

FIG. 6 shows the block diagram of a computer system 600 that may be used as a platform for a device configured to determine a location for placing a new capacity point in a network to maximize a capacity gain. The computer system 600 may also be used to execute one or more computer programs performing the methods, steps and functions described herein. The computer programs are stored in computer storage mediums.

The computer system 600 includes a processor 620, providing an execution platform for executing software. The processor 620 is configured to determine a wireless contention of the network for each of a plurality of capacity points in the network. Here, each capacity point is a network device interfacing the network with a WLAN with a WAN. The processor 620 is further configured to calculate a capacity or a gateway-limited fair capacity for each of the plurality of capacity points in the network as a function of the wireless contention at the capacity point. The processor 620 is also configured to determine a location for placing the new capacity point in the network based on the capacity or the gateway-limited fair capacities described above.

Commands and data from the processor 620 are communicated over a communication bus 630. The computer system 600 also includes a main memory 640, such as a Random Access Memory (RAM), where software may reside during runtime, and a secondary memory 650. The secondary memory 650 may include, for example, a nonvolatile memory where a copy of software is stored. In one example, the secondary memory 650 also includes ROM (read only memory), EPROM (erasable, programmable ROM), EEPROM (electrically erasable, programmable ROM), and other data storage devices, include hard disks. The main memory 640 as well as the secondary memory 650 may store the wireless contention, the capacities or the gateway-limited fair capacities and the location for the new capacity point as discussed before.

The computer system 600 includes I/O devices 660. The I/O devices may include a display and/or user interfaces comprising one or more I/O devices, such as a keyboard, a mouse, a stylus, speaker, and the like. A communication interface 680 is provided for communicating with other components. The communication interface 680 may be a wireless interface. The communication interface 680 may be a network interface. The communication interface 680 is configured to input information used to determine the wireless contention, to calculate the capacity or the gateway-limited fair capacity for each capacity point, and to determine the location for placing the new capacity point.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. A method of determining a location for a new capacity point in a wireless network, the method comprising:
   determining a wireless contention of the network for each of a plurality of capacity points in the network, wherein each capacity point is a network device interfacing the network with a second network;
   calculating a capacity for each of the plurality of capacity points in the network as a function of the wireless contention at the capacity point; and
   determining a location in the network for placing the new capacity point based on the capacities,
   wherein determining a wireless contention of the network comprises calculating $$v_g = \sum_{j=1}^{m} \sum_{i=1}^{n} R[i, j] \times I[g, j],$$

wherein vg is the wireless contention, m is a total number of links in the network, n is a total number of nodes in the network, R and I are two-dimensional matrices, i is a node of the n total number of nodes, j is a link of the m total number of links in the network, and g is a capacity point of the plurality of capacity points.

2. The method of claim 1, wherein calculating a capacity further comprises:
   modeling a wireless interface of each capacity point as alternating its time between transmitting to one-hop neighbors, receiving from one-hop neighbors, and deferring to other neighbors within a contention range.

3. The method of claim 1, wherein determining a location for placing the new capacity point further comprises:
   characterizing determining a location for placing the new capacity point as a facility location problem, wherein the capacity points map to facilities in the facility location problem and nodes in the network map to customers in the facility location problem; and
   solving the facility location problem to determine the location for placing the new capacity point,
   wherein the capacity is a gateway-limited fair capacity.

4. The method of claim 3, wherein a minimum total cost calculated from a facility cost and a cost of serving one unit of demand from a customer by a facility is used to solve the facility location problem.

5. The method of claim 3, wherein solving the facility location problem further comprises:
conducting a local search process, wherein the local search process includes
finding all valid adds for the network, wherein each add determines a cost to make a node in the network a capacity point;
finding all valid opens, wherein each open makes a node in the network a capacity point and removes and reassigns capacity points; and
finding all valid closes, wherein each close removes a capacity point and installs a set of capacity points; and
determining a delta cost for all the valid operations; and
selecting the operation with a best delta cost to determine an optimum location for placing the new capacity point.

6. The method of claim 5, wherein the method further comprises:
iteratively estimating a capacity for the new capacity point at different locations; and
terminating the estimations when the capacity exceeds a predetermined threshold.

7. The method of claim 3, wherein solving the facility location problem further comprises:
identifying a location that minimizes a hop count between the new capacity point and one or more nodes in the network.

8. The method of claim 7, wherein the location identifying is subject to a budget constraint and the gateway-limited fair capacities for the plurality of capacity points capacities in the network.

9. The method of claim 1, wherein determining a location for placing the new capacity point further comprises:
determining a location that minimizes an average contention in the network for placing the new capacity point based on a k-median problem, wherein k is a fixed number of facilities that can be opened;
repeatedly swapping sets of gateways with the new capacity point until no possible swaps can be found that improve the minimizing the average contention; and
placing the new capacity point within a predetermined distance to capacity points with greater demand.

10. The method of claim 1, wherein the location is determined to maximize a capacity gain of the network.

11. The method of claim 1, wherein the location is a geographical location in the wireless network.

12. The method of claim 1, wherein the wireless network is a wireless mesh network.

13. A device configured to determine a location for placing a new capacity point in a wireless network to maximize a capacity gain of the network, the device comprising:
a processor configured to determine a wireless contention of the network for each of a plurality of capacity points in the network, wherein each capacity point is a network device interfacing the network with a second network,
wherein the processor is further configured to calculate a capacity for each of the plurality of capacity points in the network as a function of the wireless contention at the capacity point, and to determine a location for placing the new capacity point in the network based on the capacities;
an interface configured to input information used to determine the wireless contention, to calculate the capacity for each capacity point, and to determine the location for placing the new capacity point; and
a data storage storing the wireless contention, the capacities and the location for the new capacity point,
wherein the wireless contention is $$v_g = \sum_{j=1}^{m} \sum_{i=1}^{n} R[i, j] \times I[g, j],$$

wherein vg is the wireless contention, m is a total number of links in the network, n is a total number of nodes in the network, R and I are two-dimensional matrices, i is a node of the n total number of nodes, j is a link of the m total number of links in the network, and g is a capacity point of the plurality of capacity points.

14. The device of claim 13, wherein the wireless network is a mesh network.

15. At least one non-transitory computer readable storage medium including instructions that when executed by a computer system performs a method for determining a location for a new capacity point in a wireless network, the method comprising:
determining a wireless contention of the network for each of a plurality of capacity points in the network, wherein each capacity point is a network device interfacing the network with a second network;
calculating a capacity for each of the plurality of capacity points in the network as a function of the wireless contention at the capacity point; and
determining a location in the network for placing the new capacity point based on the capacities,
wherein determining a wireless contention of the network comprises calculating $$v_g = \sum_{j=1}^{m} \sum_{i=1}^{n} R[i, j] \times I[g, j],$$

wherein vg is the wireless contention, m is a total number of links in the network, n is a total number of nodes in the network, R and I are two-dimensional matrices, i is a node of the n total number of nodes, j is a link of the m total number of links in the network, and g is a capacity point of the plurality of capacity points.

16. The at least one non-transitory computer readable medium of claim 15, wherein calculating a capacity further comprises:
modeling a wireless interface of each capacity point as alternating its time between transmitting to one-hop neighbors, receiving from one-hop neighbors, and deferring to other neighbors within a contention range.

17. The at least one non-transitory computer readable medium of claim 15, wherein determining a location for placing the new capacity point further comprises:
characterizing determining a location for placing the new capacity point as a facility location problem, wherein the capacity points map to facilities in the facility location problem and nodes in the network map to customers in the facility location problem; and
solving the facility location problem to determine the location for placing the new capacity point.

18. A method of determining a location for a new capacity point in a wireless network, the method comprising:
determining a wireless contention of the network for each of a plurality of capacity points in the network, wherein each capacity point is a network device interfacing the network with a second network;

calculating a capacity for each of the plurality of capacity points in the network as a function of the wireless contention at the capacity point; and determining a location ill the network for placing the new capacity point based on the capacities, wherein determining a location for placing the new capacity point comprises determining a location that minimizes an average contention in the network for placing the new capacity point based on a k-median problem, wherein k is a fixed number of facilities that can be opened, repeatedly swapping sets of gateways with the new capacity point until no possible swaps can be found that improve the minimizing the average contention; and placing the new capacity point within a predetermined distance to capacity points with greater demand.

* * * * *

UNITED STATES PATENT AND TRADEMARK OFFICE
CERTIFICATE OF CORRECTION

PATENT NO.        : 8,094,582 B2
APPLICATION NO.   : 12/419633
DATED             : January 10, 2012
INVENTOR(S)       : Joshua P. Robinson et al.

It is certified that error appears in the above-identified patent and that said Letters Patent is hereby corrected as shown below:

In column 13, line 4, in Claim 18, delete "ill" and insert -- in --, therefor.

Signed and Sealed this
Fourth Day of December, 2012

David J. Kappos
*Director of the United States Patent and Trademark Office*